United States Patent [19]

Sansone et al.

[11] Patent Number: 4,997,892

[45] Date of Patent: Mar. 5, 1991

[54] SULFALKYLATION OF HYDROXYETHYLATED POLYBENZIMIDAZOLE POLYMERS

[75] Inventors: Michael J. Sansone, Berkeley Heights; Balaram Gupta, North Plainfield; Charles E. Forbes, Florham Park; Mark S. Kwiatek, Union, all of N.J.

[73] Assignee: Hoechst Celanese Corp., Somerville, N.J.

[21] Appl. No.: 441,019

[22] Filed: Nov. 13, 1989

[51] Int. Cl.$^5$ .............................................. C08G 73/18
[52] U.S. Cl. ..................................... 525/435; 521/30; 525/419; 525/420
[58] Field of Search ....................... 525/435, 420, 419

[56] References Cited

U.S. PATENT DOCUMENTS 4,814,399  3/1989  Sansone et al. ................. 525/435

Primary Examiner—Harold D. Anderson
Attorney, Agent, or Firm—Joseph M. Mazzarese

[57] ABSTRACT

A sulfoalkyl derivative of N-substituted hydroxyethylated polybenzimidazole is disclosed, produced by the reaction of an N-substituted hydroxyethylated polybenzimidazole anion with a sultone. The N-substituted hydroxyethylated polybenzimidazole polymer is first reacted with an alkali hydride to produce the anion of N-substituted hydroxyethylated polybenzimidazole. The N-substituted hydroxyethylated polybenzimidazole anion is then reacted with the sultone to produce a sulfoalkyl derivative of the N-substituted hydroxyethylated polybenzimidazole polymer. These derivatives find great use as ion exchange devices.

28 Claims, No Drawings

SULFALKYLATION OF HYDROXYETHYLATED POLYBENZIMIDAZOLE POLYMERS

BACKGROUND OF THE INVENTION

1. Field of Invention

This invention relates to substituted polybenzimidazole products and a process for their production. More particularly, this invention relates to sulfoalkyl derivatives of hydroxyethylated polybenzimidazole polymers and a process for their production.

2. Prior Art

Polybenzimidazoles are a known class of heterocyclic polymers which are characterized by a high degree of thermal and chemical stability. Processes for their production are disclosed, for example in U.S. Re. 26,065 and U.S. Pat. Nos. 3,313,783, 3,509,108, 3,555,389, 3,433,722, 3,408,336, 3,549,603, 3,708,439, 4,154,919 and 4,312,976 (all patents discussed herein are incorporated by reference). Polybenzimidazole polymers have been formed into membranes, ultrafilters, reverse osmosis devices and other types of separatory media of great utility.

While polybenzimidazole polymers are generally resistant to reaction, reaction at the imidazole nitrogen-hydrogen bond occurs under certain conditions. One method of limiting this reactivity of polybenzimidazole polymers is to chemically modify the polymer. For example, U.S. Pat. Nos. 4,020,142 and 4,154,919, disclose polybenzimidazole polymers which have been crosslinked to remove the reactive nitrogen-hydrogen bond on the imidazole ring.

In another effort to reduce the chemical reactivity of polybenzimidazole polymers, the hydrogen bonded to the imidazole nitrogen has been replaced by less reactant substituents. For example, U.S. Pat. No. 3,578,644 discloses an hydroxyl substitution on the polybenzimidazole polymer prepared by the reaction of an omega-halo-alkanol or 1,2-alkylene oxide with the polybenzimidazole polymer. See also, U.S. Pat. No. 4,599,388 which discloses a different process for the production of hydroxyl substituted polybenzimidazole polymers. However, neither of these patents disclose substituted hydroxyethylated polybenzimidazole polymers, in general, or sulfoalkyl-substituted hydroxyethylated polybenzimidazole polymers, in particular.

U.S. Pat. No. 3,943,125 discloses various substituted polybenzimidazole polymers produced by the reaction of substituted tetraamino pyridines or their acid salts with a suitable acid halide or dianhydride. While the patent broadly discloses a large number of substituted tetraamino compounds, it fails to disclose the process for their preparation. It also specifically fails to disclose sulfoalkyl-substituted hydroxyethylated polybenzimidazole polymers or a process for their production.

U.S. Pat. No. 3,518,234 discloses a process for the preparation of N-aryl substituted polybenzimidazole polymers. However, the substituted polybenzimidazole polymers are not produced by direct reaction with a polybenzimidazole polymer and substantial heating of the reaction vehicle is necessary. Further, no sulfoalkyl derivatives of substituted polybenzimidazole are disclosed.

Technical reports published by Celanese Research Company (AD-755356, dated January, 1974) and Fabric Research Laboratories (AFML-TR-73-29, dated December, 1971) disclose a process for sulfonating polybenzimidazole fibers in order to reduce their thermal shrinkage. However, these reports do not disclose a process for sulfoalkylating substituted polybenzimidazole by the process of the instant invention.

It is therefore an object of this invention to produce novel substituted hydroxyethylated polybenzimidazole polymers.

It is another object of this invention to produce substituted hydroxyethylated polybenzimidazole polymers which exhibit a high degree of resistance to chemical reaction and which are stable at high temperatures.

It is an additional object of this invention to produce a sulfoalkyl hydroxyethylated polybenzimidazole polymer using an hydroxyethylated polybenzimidazole polymer as the precursor polymer.

These and other objects as well as the scope, nature, and utilization of this invention will be apparent to those skilled in the art from the following detailed description and appended claims.

SUMMARY OF INVENTION

The present invention involves a process for the production of N-substituted sulfoalkyl hydroxyethylated polybenzimidazole polymers as follows:

a. preparing an N-substituted hydroxyethylated polybenzimidazole polymer solvent solution;

b. mixing with the solution a base to form an N-substituted hydroxyethylated polybenzimidazole anion; and c. reacting the N-substituted hydroxyethylated polybenzimidazole anion with a sultone to produce an N-substituted sulfoalkyl hydroxyethylated polybenzimidazole polymer.

The N-substituted sulfoalkyl hydroxyethylated polybenzimidazole polymers produced by this process can be formed into films, fibers and other such products similar to those produced from unsubstituted polybenzimidazole polymers. However, because these polymers are substantially substituted, articles produced from them are highly resistant to chemical reaction. In addition, the water solubility of this material will allow polymer coatings to be applied from aqueous systems. Thermal treatment of these coatings then results in a non-water soluble coating.

DETAILED DESCRIPTION OF INVENTION

A. The Polybenzimidazole Starting Polymer

The polybenzimidazole polymers of this invention are a known class of heterocyclic polymers which are characterized by a recurring monomeric unit which corresponds to the following Formula I or II. Formula I is:

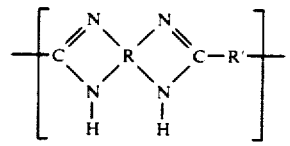

where R is a tetravalent aromatic nucleus with the nitrogen atoms forming the bibenzimidazole rings being paired upon adjacent carbon atoms, i.e., ortho carbon atoms, of the aromatic nucleus, and R' is a divalent substituent selected from aliphatic, alicyclic and aromatic radicals. Illustrative of R' substituents are divalent organic radicals containing between about 2–20 carbon atoms, such as ethylene, propylene, butylene, cyclohexylene, phenylene, pyridine, pyrazine, furan, thiophene, pyran, and the like.

Formula II corresponds to the structure:

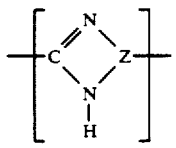

where Z is an aromatic nucleus having the nitrogen atoms forming the benzimidazole ring paired upon adjacent carbon atoms of the aromatic nucleus.

The above illustrated polybenzimidazoles can be prepared by various known processes, as described in the Background of Invention section.

The following generalized equation illustrates the condensation reaction which occurs in forming the polybenzimidazole having the recurring units of Formula I.

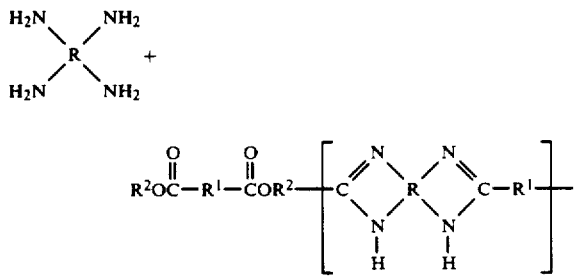

Such polybenzimidazoles are produced by the reaction of a mixture of (1) at least one aromatic tetraamine containing two groups of amine substituents, the amine substituents in each group being in an ortho position relative to each other, and (2) at least one dicarboxylate ester in which $R^1$ and $R^2$ in the compounds shown are substituents selected from aliphatic, alicyclic and aromatic groups.

Examples of polybenzimidazoles which have the recurring structure of Formula I include:

poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2"-(m-phenylene)-5',5"-di(benzimidazole)-propane2,2; and
poly-2,2'(m-phenylene)-5',5"-di(benzimidazole)-ethylene-1,2.

The preferred polybenzimidazole Formula I is poly-2,2'-(m-phenylene)-5,5'-bibenzimidazole as characterized by the recurring monomeric unit:

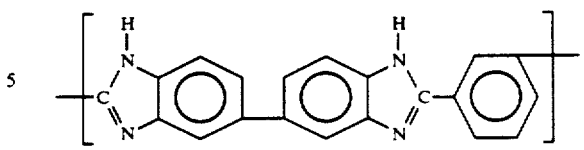

The polybenzimidazoles having the recurring monomeric unit of Formula II can be prepared by the autocondensation of at least one aromatic compound having a pair of amine substituents in an ortho position relative to each other and a carboxylate ester group positioned upon an aromatic nucleus. Examples of such compounds are esters of diaminocarboxylic acids which include 3,4-diaminonaphthalene acid; 5,6-diaminonaphthalene-1-carboxylic acid; 5,6-diamino-napthalene-2-carboxylic acid; 6,7-diaminonaphthalene-1-carboxylic acid; and the like. A preferred compound is 4-phenoxycarbonyl-3',4'-diaminodiphenyl ether. The polymer obtained with 4-phenoxycarbonyl-3',4'-diaminodiphenyl ether is poly-5-(4-phenyleneoxy) benzimidazole.

The polybenzimidazole starting material for the present invention process typically will exhibit an inherent viscosity between about 0.1–1.0 dl/g when measured at a concentration of 0.4 g of said polybenzimidazole in 100 ml of 97 percent sulfuric acid at 25° C.

The weight average molecular weight of a typical polybenzimidazole starting material will be in the range between about 1000–100,000.

B. The Carbonate Reaction

The above polybenzimidazole polymer is reacted with an ethylene carbonate in an organic solvent medium to produce the desired hydroxyethylated polybenzimidazole polymer starting material. The term "ethylene carbonate" as employed herein is meant to include lower alkyl-substituted cyclic carbonate compounds such as propylene carbonate or butylene carbonate.

The ethylene carbonate reactant can be employed essentially in any molar quantity with respect to the polybenzimidazole starting material to produce various percentages of substitution. Preferably, the ethylene carbonate reactant is employed in at least a stoichiometric quantity with respect to the reactive imidazole hydrogen sites on the polybenzimidazole polymer. In a preferred embodiment, the ratio of each ethylene carbonate molecule to each reactive imidazole group is from about 2 to about 20 to 1. It is desirable to achieve at least about a 10 percent substitution of the reactive imidazole hydrogen sites with hydroxyethyl groups and in a preferred embodiment at least about 40 percent substitution.

The concentration of the polybenzimidazole polymer and ethylene carbonate reactants in the organic solvent reaction medium is limited by the solubility of the polybenzimidazole polymer in the solvent. The molecular weight of the polybenzimidazole polymer is a factor in determining the maximum solute weight of the polymer in the organic solvent reaction medium. Generally, the polybenzimidazole polymer concentration in the organic solvent medium is in the range between about 1 and about 30 percent by weight, based on the total weight of the reaction solution. In a preferred embodiment polybenzimidazole polymer dopes of about 15 to about 25 percent based on the total solution weight are used.

The hydroxyethylation reaction between the ethylene carbonate and the polybenzimidazole polymer typically is conducted at a temperature between about 30° C. and about 225° C. for a reaction period between about 0.5-24 hours. The reaction can be accomplished conveniently at ambient pressures. In a preferred embodiment the reaction occurs at about 145° C. to about 210° C. over about a 3 to about a 5 hour reaction period.

Organic solvents suitable for the hydroxyethylation reaction include N,N-dimethlyformamide, N,N-dimethylacetamide, dimethylsulfoxide, N-methyl-2-pyrrolidone, and the like, with N,N-dimethylacetamide the preferred solvent.

When unsubstituted ethylene carbonate is used as a reactant, the substituted polybenzimidazole produced is hydroxyethylated polybenzimidazole according to the following reaction scheme:

PBI (Formula I)
PBI (Formula II) or + ethylene carbonate ⟶

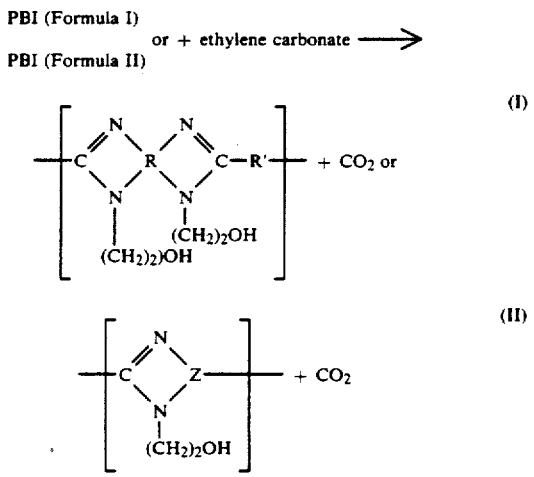

The Formula (I) and Formula (II) repeating units correspond to the Formula (I) and Formula (II) polybenzimidazole structures as previously defined.

After the reaction process is completed, the hydroxyethyl substituted polybenzimidazole can be recovered by any conventional procedures, such as by vacuum distillation of the solvent medium, to produce a residual polymeric solid, or by precipitation of the polymer from the solvent medium by addition of a non-solvent such as methanol or hexane.

C. The Hydroxyethylated Polymer Solution

After the hydroxyethylated polybenzimidazole polymer is formed, it is mixed with a solvent to form the hydroxyethylated polybenzimidazole solution.

The solvents utilized to form the hydroxyethylated polybenzimidazole polymer solution include those solvents which are commonly recognized as being capable of dissolving typical polybenzimidazcle polymers. For instance, the solvents may be selected from those commonly utilized in the formation of polybenzimidazole dry spinning solutions including N,N-dimethylacetamide, N,N-dimethylformamide, dimethylsulfoxide, and N-methyl-2-pyrrolidone, with N-methyl-2-pyrrolidone the preferred solvent. Additional representative solvents include formic acid, acetic acid, and sulfuric acid.

The polymer solution may be prepared, for example, by dissolving sufficient hydroxyethylated polybenzimidazole polymer in the solvent to yield a final solution containing from about 1 to about 35 percent by weight of the polymer based on the total weight of the solution. When the solution contains concentrations of hydroxyethylated polybenzimidazole polymer less than about 5 percent, the substitutions obtained are less than optimum. When concentrations of hydroxyethylated polybenzimidazole polymer approach about 35 percent, the hydroxyethylated polybenzimidazole polymer solution must be heated to complete the subsequent reaction with the sultone. Therefore, it is preferred that the concentration of hydroxyethylated polybenzimidazole in solution ranges from about 5 to about 20 percent by weight. The quantity of hydroxyethylated polybenzimidazole dissolved in the solvent should be such that the resulting solution has a viscosity of about 50 to about 4,000 poise at 30° C., and preferably from about 400 to about 600 poises.

One suitable means for dissolving the polymer in the solvent is by mixing the materials at a temperatures above the normal boiling point of the solvent, for example, about 25° C. to about 120° C. above such boiling point, and at a pressure of about 2 to about 15 atmospheres for a period of about 1 to about 5 hours under constant stirring. The resulting solutions are preferably filtered to remove any undissolved polymer.

D. The Base Reaction

To the hydroxyethylated polybenzimidazole solution prepared above is added a base to create an hydroxyethylated polybenzimidazole anion. The base can be any organic or inorganic base of sufficient strength (a pka of at least about 9) to generate the hydroxyethylated polybenzimidazole anion. Although, inorganic bases such as sodium hydroxide or potassium hydroxide, may be used, the preferred bases include alkali metal hydrides, lithium hydride being the most preferred. Organic bases also may be used since they will generally mix easier with the hydroxyethylated polybenzimidazole solvent solution. Where an inorganic base is used, however, it is slurried at the bottom of the reaction vessel to generate the hydroxyethylated polybenzimidazole anion.

In a preferred embodiment the suitable organic bases include alkoxides, organometallic bases, amides, quaternary ammonium hydroxides or other well-known organic bases. In a more preferred embodiment, the suitable organic bases include benzyl trimethyl ammonium hydroxide, sodium methoxide, sodium amide, butyl lithium, Grignard reagents or other similar organic bases having a pka of at least 9. In a most preferred embodiment alkali hydrides are used as the base.

Although any alkali hydride, such as lithium, sodium or potassium hydride may be used in the reaction, lithium hydride is preferred for several reasons. The lithium salts generated in the subsequent substitution reaction do not interferingly react with the substituted hydroxyethylated polybenzimidazole polymers produced. Further, it is presumed that the small ionic radius of the lithium cation allows it to be well solvated, which disrupts the ion pairing between it and the hydroxyethylated polybenzimidazole anion. This disruption increases the solubility of the lithium salt and simultaneously generates a more nucleophilic hydroxyethylated polybenzimidazole anion, which is thus more reactive.

Although low concentrations of the base can be used, in a preferred embodiment the ratio of base to the available imidazole hydroxyethylated sites on the polybenzimidazole polymer should be about 0.01:1 to about 5:1 and, in a more preferred embodiment, the ratio is from about 0.25:1 to about 1:1. When stoichiometric quantities of the base in relationship to the available hydroxyethylated sites on the hydroxyethylated polybenzimidazole polymer are reacted with a hydroxyethylated polybenzimidazole polymer, at least about 80 percent of the available hydroxyethyl sites are ionized. Higher concentrations of the base produce greater percentages of ionization of the hydroxyethylated polybenzimidazole polymer, which subsequently result in greater substitutions on the hydroxyethylated polybenzimidazole polymer in the succeeding substitution reaction. However, no significant increase in substitution is achieved when the ratio of the base to the available hydroxyethyl sites exceeds about 2:1.

Following the addition of the base to the polybenzimidazole polymer solution, the solution may be allowed to react at room temperature or in a preferred embodiment the solution is heated to a temperature of about 50° C. to about 120° C. and allowed to react under constant stirring for a period of about 5 to about 48 hours. During the ionization reaction, hydrogen gas evolves and is discharged. When hydrogen gas evolution ceases, it may be assumed that the reaction has gone to completion.

The reaction produces an hydroxyethylated polybenzimidazole anion by the following reaction scheme, when using the hydroxyethylated polybenzimidazole polymer produced from the polybenzimidazole polymer as previously disclosed:

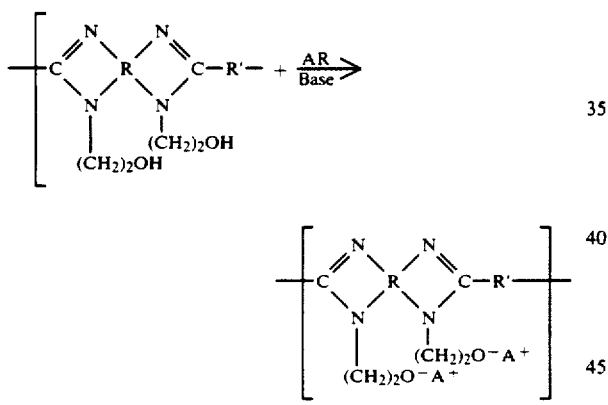

wherein AH is an inorganic base as previously disclosed.

C. The Sultone Reaction

The hydroxyethylated polybenzimidazole anion in solution is next reacted with a sultone to produce a sulfoalkyl derivative of the hydroxyethylated polybenzimidazole polymer. Sultones are cyclic esters of sulfonic acid, analogous to carboxylic acid lactones. Beta, gamma, delta and eta sultones have been synthesized. As a relatively easily prepared reactive compound for introducing a sulfonate group onto other compounds, sultones have been useful in the synthesis of many products, for example, detergents, for the preparation of dyestuff intermediates, as surface active agents in textiles, and as insect repellants. Because of the high reactivity of sultones, a variety of compounds have been sulfoalkylated with sultones including inorganic salts, ammonia, amines, amides, phosphines, phosphoric acid esters, carboxylic acid salts, alcoholates, mercaptides and phenolates. For a general review of sultone chemistry, see Ahmed Mustafa, *Chemical Review*, pp. 195-223, (1954), which is incorporated herein by reference.

Although many types of sultones can be reacted with the hydroxyethylated polybenzimidazole anion to produce useful sulfoalkylated products, the preferred sultones are beta (four member rings), gamma (five member ring), and delta (six member ring) sultones and the most preferred are beta sultones.

Once the hydroxyethylated polybenzimidazole anion has been produced, quantities of the desired sultone are added to the reaction vessel. For example, using 1,3 propane sultone and the hydroxyethylated polybenzimidazole anion previously disclosed as the reactants, the reaction scheme is as follows:

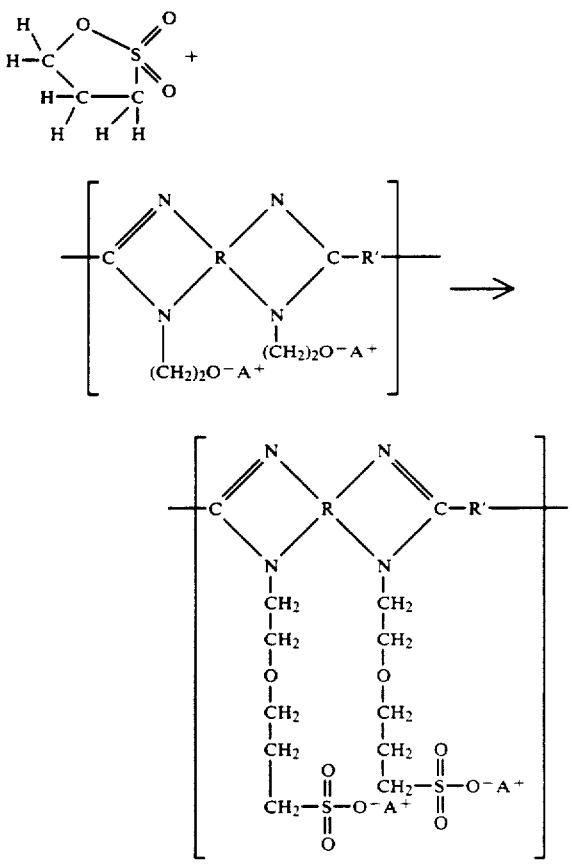

where R, R' and A are as previously defined.

In the example above shown the imidazole hydrogen on the polybenzimidazole polymer has been completely substituted. However, as previously stated, the degree of substitution will vary. With a significantly strong base the anion produced will remove the hydrogen from both the imidazole nitrogen and from the hydroxyethylated radical.

Because the starting hydroxyethylated polybenzimidazole polymer is generally not 100 percent substituted with hydroxyethyl groups, the sultone will react not only with the hydroxyethyl groups located on the hydroxyethylated polybenzimidazole polymer but also with the unsubstituted hydrogen on the imidazole nitrogen. The materials that are produced as a result of this reaction can vary significantly depending upon the degree of substitution with hydroxyethyl groups. For a 50 percent substituted hydroxyethylated polybenzimidazole starting material the structure of the substituted hydroxyethylated polybenzimidazole polymer will be generally as follows:

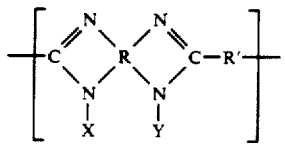

where X, Y equal the following percentages of substitutions:

| Group | Percentage |
|---|---|
| N-H | 35-10 |
| N-CH$_2$CH$_2$OH | 40-15 |
| N-CH$_2$CH$_2$CH$_2$SO$_3$H | 15-40 |
| N-CH$_2$CH$_2$OCH$_2$CH$_2$CH$_2$SO$_3$H | 10-35 |

At least a stoichiometric quantity of the sultone is added to the hydroxyethylated polybenzimidazole anion solution and, in a preferred embodiment, the sultone is present in a ratio of about 1:1 to about 4:1 for each available hydroxyethylated polybenzimidazole anion.

Sultones, which are usually in liquid form, can be directly added to the reaction vessel or they can be mixed with an equal quantity of the solvent for the hydroxyethylated polybenzimidazole polymer for ease of addition and to prevent localized precipitation. After addition of the sultone, the reaction vessel is heated to a temperature of about 40° C. to about 150° C. and the reaction is conducted at that temperature for a period of about 12 to about 72 hours. The temperature and time of the reaction will vary depending upon the type of sultone, the substituents on the sultone and the degree of substitution sought on the hydroxyethylated polybenzimidazole polymer. Larger ring sultones, such as eta sultones, or highly substituted sultones may require both longer reaction times and higher temperatures for the reaction to go to completion. Using a sufficient quantity of the chosen sultone and allowing the reaction to go to completion, substitutions on the available hydroxyethylated polybenzimidazole anion of at least about 40 percent and up to about 100 percent are generally produced. As previously discussed substitutions will occur not only at the available hydroxyethylated polybenzimidazole anion but at available unsubstituted imidazole nitrogen sites producing varying substituted polybenzimidazole polymers.

Beta sultones useful in this reaction process have a general formula as follows:

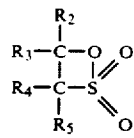

wherein R$_2$ and R$_3$ are the same as or different from each other and are selected from the group consisting of hydrogen, a halide or a C$_1$ to C$_3$ unsubstituted alkyl member, and R$_4$ and R$_5$ are the same as or different from each other and are selected from the group consisting of hydrogen, a halide, or a C$_1$ to C$_6$ substituted or unsubstituted alkyl member, with the preferred substitution being hydrogen. Examples of useful beta sultones include 2-hydroxy-1-propane sulfonic acid sultone, 2-hydroxy-1,1,2,2'-tetrafluroethane sulfonic acid or 2-hydroxy-1,2-dichloro-1,2-ditrifluromethyl-ethane sulfonic acid sultone with 2-hydroxy-1-propane sulfonic acid sultone the preferred beta sultone. Beta sultones react significantly better with the hydroxyethylated polybenzimidazole polymer than do larger ring sultones, presumably because of the steric strain of the 4 membered sultone ring.

The reaction scheme with 2-hydroxy-1-propane sulfonic acid sultone reacting directly with the hydroxyethylated polybenzimidazole anion in solvent solution assuming 100 percent substitution is as follows:

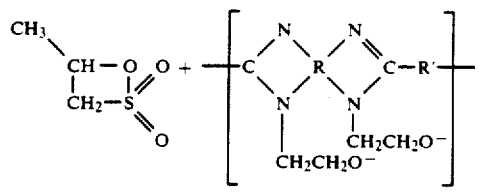

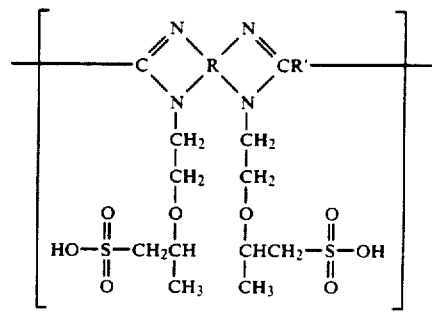

The gamma and delta sultones which are useful in carrying out the process of the instant invention may be characterized by the following general formula:

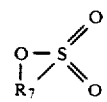

wherein R$_7$ is a divalent substituted or unsubstituted C$_3$ or C$_4$ alkyl member wherein the substituents may be the same as or different from each other and are selected from the group consisting of hydrogen, halides, and C$_1$ to C$_6$ substituted or unsubstituted alkyl groups, with the preferred substituents being hydrogen. In a preferred embodiment, the carbon atom adjacent to the oxygen on the sultone ring must be either unsubstituted or substituted only with a halide or an unsubstituted C$_1$ to C$_3$ alkyl members. Among the preferred gamma and delta sultones are 3-hydroxy-1-propane sulfonic acid sultone and 4-hydroxy-butane sulfonic acid sultone. As previously stated, higher reaction temperatures or longer reaction times may be necessary for the reaction with a gamma or a delta sultone to go to completion than with a beta sultone.

When hydroxyethylated polybenzimidazole polymers of Formula I are used, the alkyl sulfonated hydroxyethylated polybenzimidazole polymers produced by this process have a general formula of:

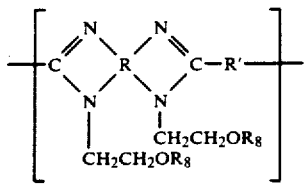

where R and R' are as previously disclosed and $R_8$ is a $C_2$ to $C_4$ substituted or unsubstituted alkyl member wherein the substituents may be the same as or different from each other and are selected from the group consisting of hydrogen, halides and $C_1$ to $C_6$ unsubstituted alkyl members. In a preferred embodiment the $C_2$ to $C_4$ alkyl member is unsubstituted.

Once the reaction has gone to completion, the sulfoalkyl derivative of the hydroxyethylated polybenzimidazole polymer may be recovered from the reaction vessel by the addition of a non-solvent such as acetone since the sulfoalkyl derivative so formed is water soluble unlike other known substituted polybenzimidazole derivatives. After washing and drying the precipitate by well-known procedures, such as washing the precipitate with acetone and air drying it for about 2 to about 24 hours, the sulfoalkyl derivative of hydroxyethylated polybenzimidazole polymer recovered may be used for a variety of end uses including spinning it into a fiber, or casting it into a film. In a particularly preferred end use, it may be formed into an ion exchange device.

The following Examples are given as specific illustrations of the invention. All parts and percentages are by weight unless otherwise stated. It is understood, however, that the invention is not limited to the specific details set forth in the Examples.

Example 1

A polybenzimidazole starting solution was prepared by stirring 15 grams of poly-2,2'-(m-phenylene)-5,5'-bibenzimidazole polymer in particulate form, with 85 grams of N,N-dimethylacetamide and 1.7 grams of lithium chloride for five hours under argon gas in a 1000 ml stainless steel Hoke bomb at 230° C. The solution was then filtered to remove any residual solids. The solution was transferred to a three necked, round bottom flask, fitted with a reflux condenser, a mechanical stirrer, and a thermometer, and 7.8 grams of 98 percent pure ethylene carbonate were added. The reaction flask was heated to 145° C. and held at that temperature for 6 hours. The solution was then cooled to room temperature and added to 200 grams of acetone to precipitate out the resultant solids, which were then air dried. Analysis disclosed the presence of 18.1 grams of hydroxyethylated polybenzimidazole, with a percentage of substitution of about 75 percent.

Example 2

To a round bottom reaction flask were added 10 grams of the 75.0 percent substituted hydroxyethylated poly-2,2'-(m-phenylene)-5,5'-bibenzimidazole produced in Example 1, 40 grams of N-methyl-2-pyrrolidone and 0.7 grams of lithium hydride. The reaction temperature was raised to 35° C. and held for 16 hours. 8 grams of 1,3-propane sultone, which was diluted by an equal quantity of N-methyl-2-pyrrolidone, were added to the solution by an addition funnel. The reaction flask was heated to 80° C. and the reactants were allowed to react for 24 hours. A sample was removed from the reaction flask, precipitated by the addition of an equal quantity of acetone and then washed with acetone. The precipitant, which was analyzed by nuclear magnetic resonance spectroscopy, showed the following substitutions on the imidazole nitrogen:

| Group | Percentage |
|---|---|
| N-H | 10 |
| N-CH$_2$CH$_2$OH | 40 |
| N-CH$_2$CH$_2$CH$_2$SO$_3$H | 25 |
| N-CH$_2$CH$_2$OCH$_2$CH$_2$CH$_2$SO$_3$H | 25 |

As can be seen, the reaction of the hydroxyethylated polybenzimidazole with sultones in the presence of a base produces high percentages of substitution of a sulfoalkyl derivative of hydroxyethylated polybenzimidazole polymer. These polymers can be formed into films, fibers and other products of great utility which are highly resistant to chemical reaction.

We claim:

1. A process for preparing an N-substituted derivative of hydroxyethylated polybenzimidazole which comprises the steps of:
   a. preparing an N-substituted hydroxyethylated polybenzimidazole polymer solvent solution wherein at least about 10 percent of the imidazole hydrogen sites are hydroxyethyl substituted;
   b. mixing a base with the solution to form an N-substituted hydroxyethylated polybenzimidazole anion; and
   c. reacting the N-substituted hydroxyethylated polybenzimidazole anion with a sultone to produce a sulfoalkyl derivative of the N-substituted hydroxyethylated polybenzimidazole polymer.

2. A process for preparing an N-substituted derivative of hydroxyethylated polybenzimidazole which comprises the steps of:
   a. preparing an N-substituted hydroxyethylated polybenzimidazole solvent solution wherein at least 40 percent of the imidazole hydrogen sites are hydroxyethyl substituted and wherein about 1 to about 35 percent of the solution by weight is comprised of at least 40 percent N-substituted hydroxyethylated polybenzimidazole polymer;
   b. mixing with the solution about 1 to about 15 percent by weight of a base with a pka of at least about 9 to form an N-substituted hydroxyethylated polybenzimidazole anion; and
   c. reacting with the N-substituted hydroxyethylated polybenzimidazole anion at least a stoichiometric concentration of a sultone to produce a sulfoalkyl derivative of the N-substituted hydroxyethylated polybenzimidazole polymer.

3. A process for preparing an N-substituted derivative of hydroxyethylated polybenzimidazole comprises the steps of:
   a. preparing an N-substituted hydroxyethylated polybenzimidazole polymer solvent solution wherein at least 40 percent of the imidazole hydrogen sites are hydroxyethyl substituted and wherein about 5 to about 20 percent of the solution by weight is comprised of the 40 percent N-substituted hydroxyethylated polybenzimidazole polymer;
   b. mixing with the solution about 1 to about 8 percent by weight of an alkali hydride to form an N-substituted hydroxyethylated polybenzimidazole anion; and c. reacting with the N-substituted hydroxyethylated polybenzimidazole anion a sultone in a ratio of about 1:1 to about 5:1 sultone units to each N-substituted hydroxyethylated polybenzimidazole anion to produce a sulfoalkyl derivative of N-substituted hydroxyethylated polybenzimidazole polymer.

4. The process as in any of claims 1, 2 or 3 wherein the N-substituted hydroxyethylated polybenzimidazole starting material is characterized by recurring monomeric units of:

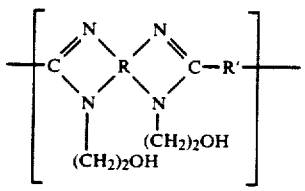

wherein R is a divalent aromatic nucleus with the nitrogen atoms forming benzimidazole rings being paired upon adjacent carbon atoms, and R' is the divalent substitute selected from aliphatic, alicyclic or aromatic radicals containing between about 2-20 carbon atoms.

5. The process as in any of claims 1, 2 or 3 wherein the N-substituted hydroxyethylated polybenzimidazole polymer starting material is comprised of recurring monomeric units of:

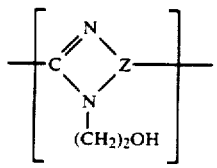

wherein Z is an aromatic nucleus having the nitrogen atom forming the benzimidazole ring paired upon adjacent carbon atoms of the aromatic nucleus.

6. The process as in any of claim 1, 2 or 3 wherein the N-substituted hydroxyethylated polybenzimidazole polymer is N-substituted hydroxyethylated poly-2,2'-(m-phenylene)-5,5'-bibenzimidazole.

7. The process of claim 1 wherein the concentration of the N-substituted hydroxyethylated polybenzimidazole polymer in the solvent solution is from about 1 to about 35 percent by weight based on the total weight of the solution.

8. The process as in any of claims 1 or 2 wherein the concentration of the N-substituted hydroxyethylated polybenzimidazole in the solvent solution is in the range of about 5 to about 20 percent by weight based on the total weight of the solution.

9. The process as in any of claims 1, 2 or 3 wherein at least about 50 percent of the available hydroxyethyl groups on the N-substituted hydroxyethylated polybenzimidazole polymer are sulfoalkylated.

10. The process as in any of claims 1, 2 or 3 wherein the solvent capable of dissolving the N-substituted hydroxyethylated polybenzimidazole is selected from the group consisting of N,N-dimethylacetamide, N,N-dimethylformamide, dimethylsulfoxide and N-methyl-2-pyrrolidone.

11. The process of claim 10 wherein the solvent is N-methyl-2-pyrrolidone.

12. The process as in any of claims 1 or 2 wherein the base has a pka of at least about 9 and is selected from the group consisting of hydrides, alkoxides, organometallic bases, amides, or quaternary ammonium hydroxides.

13. The process of claim 12 wherein the base is an alkali hydride.

14. The process of claim 1 wherein the base is mixed with the N-substituted hydroxyethylated polybenzimidazole polymer solution for a period of about 1 to about 5 hours.

15. The process as in any claims 1, 2 or 3 wherein the sultone has the general formula of:

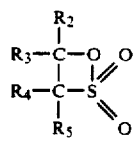

wherein $R_2$ and $R_3$ are selected from the group consisting of hydrogen, halides, or a $C_1$ to $C_3$ unsubstituted alkyl group and $R_4$ and $R_5$ are selected from the group consisting of hydrogen, a halide or a $C_1$ to $C_6$ substituted or unsubstituted alkyl substituent.

16. The process as in any of claims 1, 2 or 3 wherein the sultone has the following general formula:

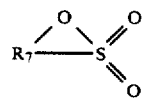

wherein $R_7$ is a divalent substituted or unsubstituted $C_3$ or $C_4$ alkyl member wherein the substituents are selected from the group consisting of hydrogen, halides and $C_1$ to $C_3$ substituted or unsubstituted alkyl groups.

17. The process of claim 1 wherein the sultone is 2-hydroxy-1-propane sulfonic acid sultone.

18. The process of claim 2 wherein the sultone is 3-hydroxy-1-propane sulfonic acid sultone.

19. The process of claim 1 wherein at least a stoichiometric concentration of the sultone is reacted with the N-substituted hydroxyethylated polybenzimidazole anion.

20. The process as in any of claims 1 or 2 wherein the ratio of the sultone units to each N-substituted hydroxyethyl polybenzimidazole anion site is from about 2:1 to about 5:1.

21. The process as in any of claims 1, 2 or 3 wherein the reaction of the N-substituted hydroxyethylated polybenzimidazole with the sultone is conducted at a temperature of from about 35° C. to about 80° C.

22. The process as in any of claims 1, 2 or 3 wherein the reaction between the N-substituted hydroxyethylated polybenzimidazole and the sultone is conducted for a period of about one hour to about 24 hours.

23. A sulfoalkyl derivative of N-substituted hydroxyethylated polybenzimidazole polymer.

24. A process for preparing an N-substituted hydroxyethylated polybenzimidazole polymer comprising the steps:

a. preparing an N-substituted hydroxyethylated polybenzimidazole polymer solvent solution wherein the N-substituted hydroxyethylated polybenzimidazole polymer consists essentially of recurring units of the formula:

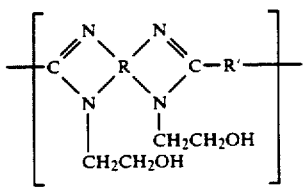

where R is a tetravalent aromatic nucleus with the nitrogen atoms forming the bibenzimidazole rings being paired upon adjacent carbon atoms of the aromatic nucleus, b. mixing with the N-substituted hydroxyethylated polybenzimidazole polymer an alkali hydride selected from the group consisting of sodium hydride, lithium hydride or potassium hydride wherein at least about 0.75 alkali hydride units are present for each N-substituted hydroxyethylated site on the hydroxyethylated polybenzimidazole polymer to produce an N-substituted hydroxyethylated polybenzimidazole anion; and c. reacting the N-substituted hydroxyethylated polybenzimidazole anion with a sultone having the general formula of:

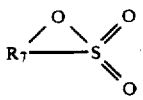

wherein $R_7$ is a divalent substituted or unsubstituted $C_3$ or $C_4$ alkyl member wherein the substituent is selected from the group consisting of hydrogen, halides and $C_1$ to $C_3$ substituted or unsubstituted alkyl groups to produce a sulfoalkyl derivative of the N-substituted hydroxyethylated polybenzimidazole polymer.

25. The N-substituted sulfoalkyloxyethyl polybenzimidazole produced by the process of claim 1.

26. The N-substituted sulfoalkyloxyethyl polybenzimidazole produced by the process of claim 2.

27. The N-substituted sulfoalkyloxyethyl polybenzimidazole produced by the process of claim 3.

28. The N-substituted sulfoalkyloxyethyl polybenzimidazole produced by the process of claim 24.

* * * * *